(12) United States Patent
Ge et al.

(10) Patent No.: US 12,508,948 B2
(45) Date of Patent: Dec. 30, 2025

(54) METHODS AND SYSTEM FOR CHARGING AND HEATING A TRACTION BATTERY

(71) Applicant: Ford Global Technologies, LLC, Dearborn, MI (US)

(72) Inventors: Baoming Ge, Okemos, MI (US); Petros G. Taskas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 18/487,773

(22) Filed: Oct. 16, 2023

(65) Prior Publication Data

US 2025/0121738 A1    Apr. 17, 2025

(51) Int. Cl.

| | |
|---|---|
| *B60L 58/22* | (2019.01) |
| *B60L 50/60* | (2019.01) |
| *B60L 58/21* | (2019.01) |
| *B60L 58/25* | (2019.01) |
| *B60L 58/27* | (2019.01) |
| *H01M 10/42* | (2006.01) |
| *H01M 10/44* | (2006.01) |
| *H01M 10/615* | (2014.01) |
| *H01M 10/625* | (2014.01) |
| *H01M 10/637* | (2014.01) |
| *H01M 50/204* | (2021.01) |
| *H01M 50/249* | (2021.01) |
| *H01M 50/296* | (2021.01) |

(52) U.S. Cl.
CPC ............... *B60L 58/22* (2019.02); *B60L 50/60* (2019.02); *B60L 58/21* (2019.02); *B60L 58/25* (2019.02); *B60L 58/27* (2019.02); *H01M 10/425* (2013.01); *H01M 10/441* (2013.01); *H01M 10/615* (2015.04); *H01M 10/625* (2015.04); *H01M 10/637* (2015.04); *H01M 50/204* (2021.01); *H01M 50/249* (2021.01); *H01M 50/296* (2021.01); *B60L 2210/40* (2013.01); *H01M 2010/4271* (2013.01); *H01M 2220/20* (2013.01)

(58) Field of Classification Search
CPC .......... B60L 58/22; B60L 58/27; B60L 50/60; B60L 58/25; B60L 2210/40; H01M 10/615; H01M 50/296; H01M 10/425; H01M 2220/20

See application file for complete search history.

(56) References Cited

U.S. PATENT DOCUMENTS

| | | | |
|---|---|---|---|
| 2021/0094426 A1 | 4/2021 | Elshaer et al. | |
| 2022/0274496 A1 | 9/2022 | Gannamaneni et al. | |
| 2022/0368270 A1* | 11/2022 | Huang | B60L 58/27 |
| 2024/0059187 A1* | 2/2024 | Chen | B60L 58/19 |

FOREIGN PATENT DOCUMENTS

DE   102021123981 A1 *   3/2023   ............ B60L 3/0046

* cited by examiner

*Primary Examiner* — Rexford N Barnie
*Assistant Examiner* — Duc M Pham
(74) *Attorney, Agent, or Firm* — David Kelley; McCoy Russell LLP

(57) ABSTRACT

Systems and methods for operating a vehicle power system are described. The vehicle power system includes an inverter and an electric machine. Switches and a diode are arranged in a way that allows a traction battery to be charged by either a lower voltage charger or a higher voltage charger. Additionally, the switches and diode allow the vehicle power system to heat the traction battery so that the traction battery may operate in a desired temperature range.

18 Claims, 6 Drawing Sheets

METHODS AND SYSTEM FOR CHARGING AND HEATING A TRACTION BATTERY

FIELD

The present description relates to methods and a system for charging and heating a traction battery of an electric vehicle or a hybrid vehicle. The methods and systems may be particularly useful for vehicles that include higher voltage traction batteries.

BACKGROUND AND SUMMARY

An electric or hybrid vehicle may include a traction battery that provides power to and receives power from an electric machine. The electric machine may operate as a motor to provide propulsive effort to vehicle wheels and the electric machine may operate as a generator or alternator to convert the vehicle's kinetic energy into electrical energy. The traction battery may be configured as a four-hundred-volt battery. However, recent trends include replacing four hundred volt batteries with eight-hundred-volt batteries to reduce vehicle weight and increase vehicle efficiency. Nevertheless, many fast direct current (DC) chargers are configured as four-hundred volt chargers, not eight-hundred-volt chargers. As such, there may be compatibility issues between existing chargers and proposed traction batteries.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
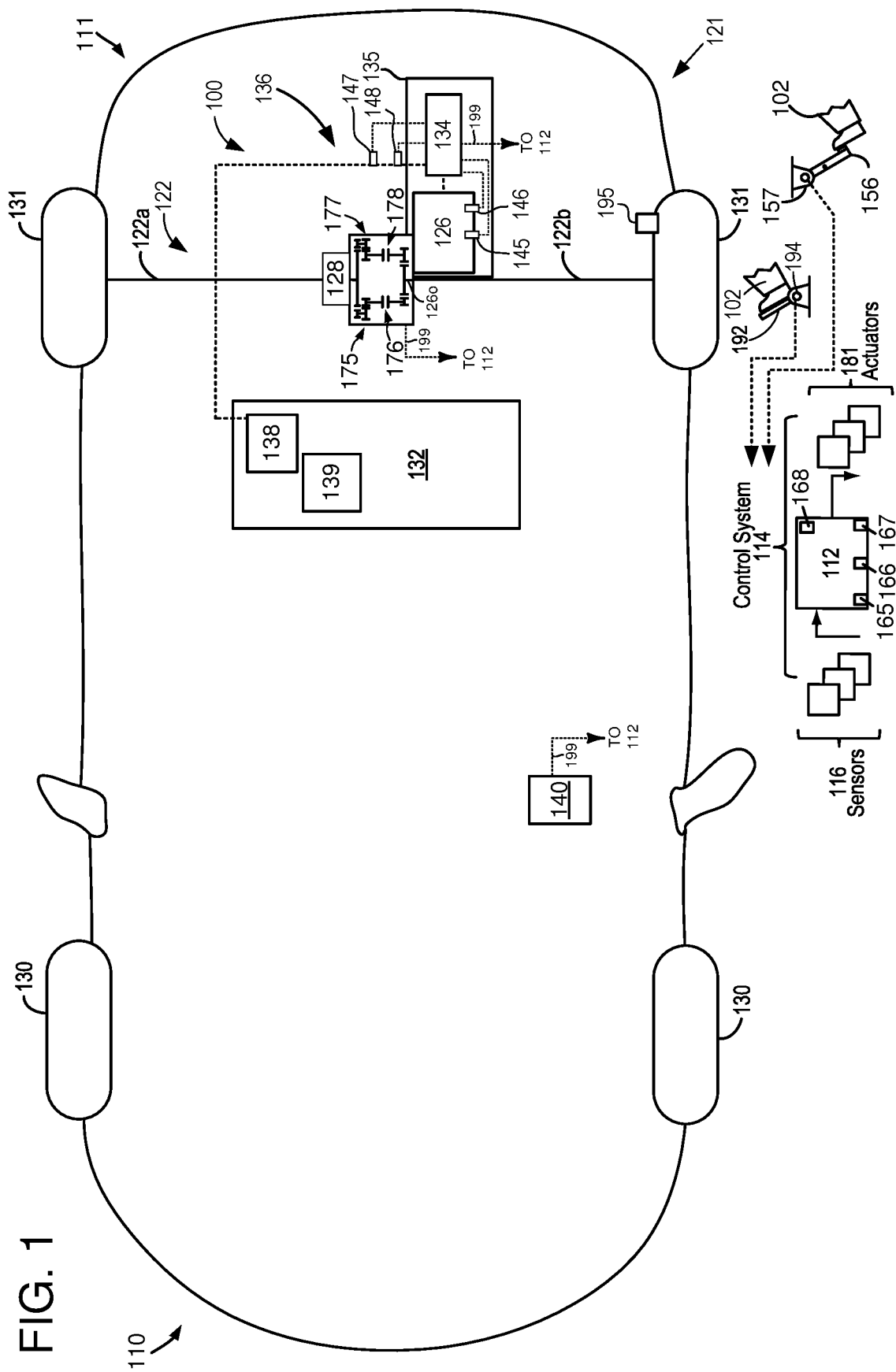
FIG. 1 is a schematic view of an example electric vehicle.
Figure 2:
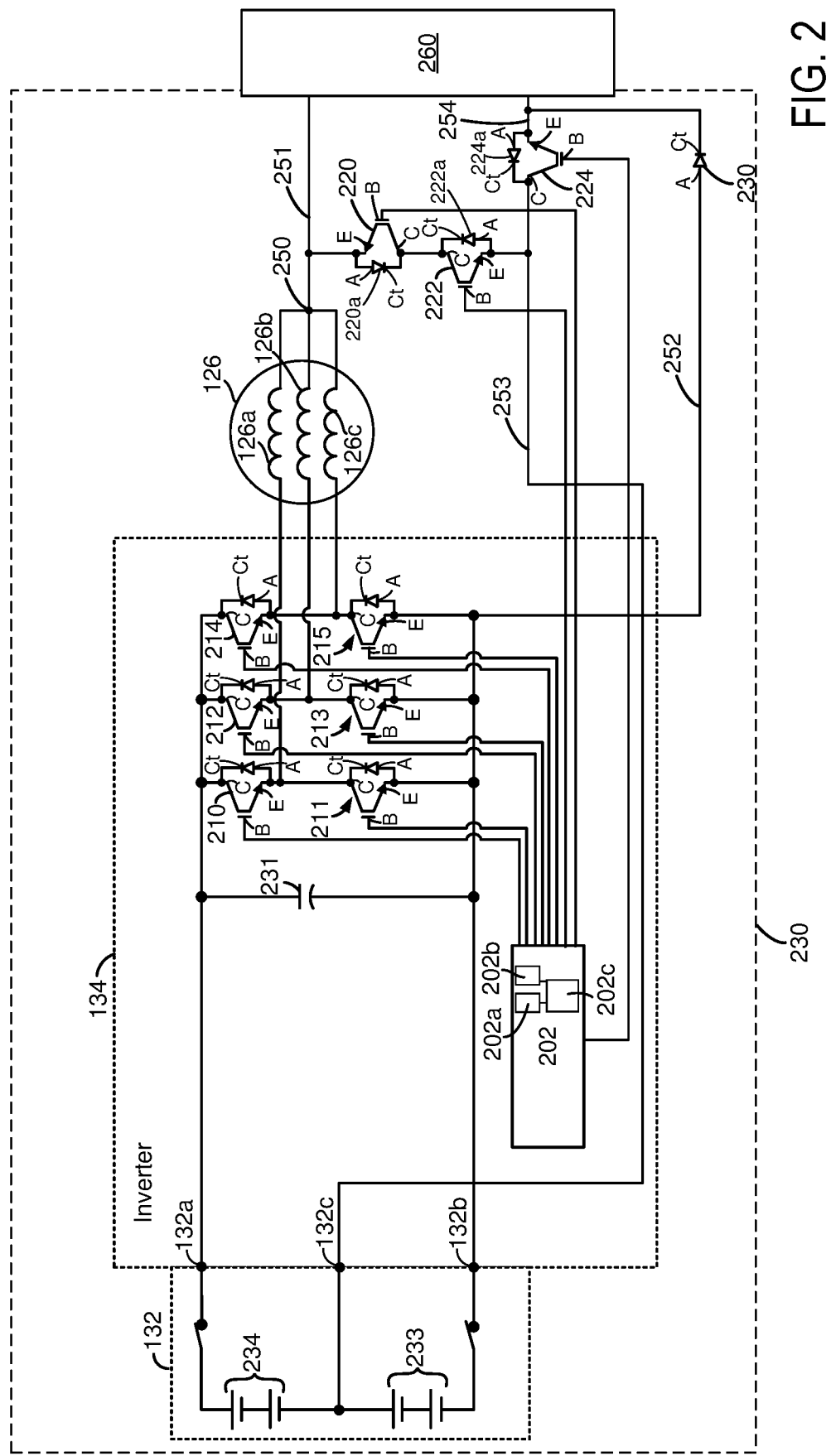
FIG. 2 is a schematic diagram of a modified traction battery charging system.

The present description is related to operating a charging and heating system for a traction battery. The charging and heating system may increase charging efficiency when charging a higher voltage battery via a battery charger that outputs a lower voltage. In particular, a four-hundred-volt charger may charge an eight-hundred-volt battery according to the system and methods described herein. The charging and heating system may be included in an electric vehicle as shown in FIG. 1. The charging and heating system and be constructed as shown in FIG. 2. The charging and heating system may operate as shown in FIGS. 3, 4, and 6-8. The charging and heating system may include control circuitry as shown in FIG. 5. The charging and heating system may be operated according to the method of FIG. 9.

Recently, eight-hundred-volt vehicle electrical systems have been proposed to increase system efficiency and reduce vehicle weight. By powering an electric machine that supplies propulsive effort via an eight-hundred-volt battery, it may be possible to reduce the weight of the electric machine. However, since eight-hundred-volt electric machines and traction batteries are relatively new, few eight-hundred-volt chargers have been constructed and are available for charging these traction batteries. On the other hand, four-hundred-volt chargers are relatively more common, but connecting them to an eight-hundred-volt vehicle electric system may not be as efficient as may be desired. For example, a four-hundred-volt charger may be coupled to an eight-hundred-volt traction battery by operating a vehicle's inverter in a boost mode, thereby boosting four-hundred-volts to eight-hundred-volts. However, operating the inverter in a boost mode may reduce charging efficiency due to higher losses from the inverter, electric machine windings, and electric machine core. Therefore, it may be desirable to provide a way of charging a higher voltage electrical system of a vehicle more efficiently via a lower voltage vehicle charger.

The inventors herein have recognized the above-mentioned issues and have developed a vehicle power system, comprising: a traction battery comprising a first group of battery cells arranged in series and a second group of battery cells arranged in series, the first group of battery cells arranged in series with the second group of battery cells, a high voltage terminal directly electrically coupled to the first group of battery cells, a low voltage terminal directly electrically coupled to the second group of battery cells, a middle voltage terminal directly electrically coupled to the first group of battery cells and the second group of battery cells; an electric machine to provide propulsive effort for a vehicle; and an inverter coupled to the traction battery and the electric machine.

By including a three terminal battery in a vehicle electrical system it may be possible to charge the three terminal battery via a low voltage charger that outputs a low voltage (e.g., a four-hundred-volt charger). In particular, the low voltage charger may be coupled to a first group of battery cells via a high voltage terminal of the traction battery and a middle voltage terminal of the traction battery so that half of the traction battery's battery cells may be charged via the low voltage charger during a first time period. The low voltage charger may be coupled to a second group of battery cells via the middle voltage terminal of the traction battery and a low voltage terminal of the traction battery so that the other half of the traction battery's cells may be charged via the low voltage charger during a second time period.

The present description may provide several advantages. In particular, the approach may increase charging efficiency for a traction battery. Further, the approach allows for charging of a traction battery via a lower voltage charger (e.g., a four-hundred-volt charger) and higher voltage charger (e.g., an eight-hundred-volt charger). Additionally, the approach allows the battery to be heated to a desired operating temperature range with fewer losses as compared to other approaches.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

FIG. 1 is a block diagram of a vehicle 121 including a powertrain or driveline 100. A front portion of vehicle 121 is indicated at 110 and a rear portion of vehicle 121 is indicated at 111. Driveline 100 includes electric machine 126. Electric machine 126 may consume or generate electrical power depending on its operating mode. Throughout the description of FIG. 1, mechanical connections between various components are illustrated as solid lines, whereas electrical connections between various components are illustrated as dashed lines.

Driveline 100 has a rear axle 122. In some examples, rear axle 122 may comprise two half shafts, for example first half shaft 122a, and second half shaft 122b. Driveline 100 also includes front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 1260 of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122a and to second half shaft 122b. In some examples, an electrically controlled differential clutch (not shown) may be included in rear drive unit 136.

Electric machine 126 may receive electrical power from onboard electric energy storage device 132. Furthermore, electric machine 126 may provide a generator function to convert the vehicle's kinetic energy into electrical energy, where the electrical energy may be stored at electric energy storage device 132 for later use by electric machine 126. An inverter 134 may convert alternating current generated by electric machine 126 to direct current for storage at the electric energy storage device 132 and vice versa. Electric drive system 135 includes electric machine 126 and inverter 134. Electric energy storage device 132 may be a traction battery (e.g., a battery that supplies power to propel a vehicle), capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, electric energy storage device 132, etc. Control system 114 may receive sensory feedback information from electric drive system 135 and electric energy storage device 132, etc. Further, control system 114 may send control signals to electric drive system 135 and electric energy storage device 132, etc., responsive to this sensory feedback. Control system 114 may receive an indication of an operator requested output of the vehicle propulsion system from a human operator 102, or an autonomous controller. For example, control system 114 may receive sensory feedback from pedal position sensor 194 which communicates with pedal 192. Pedal 192 may refer schematically to a driver demand pedal. Similarly, control system 114 may receive an indication of an operator requested vehicle slowing via a human operator 102, or an autonomous controller. For example, control system 114 may receive sensory feedback from pedal position sensor 157 which communicates with vehicle slowing pedal 156.

Electric energy storage device 132 may periodically receive electrical energy from a power source such as a stationary power grid (not shown) residing external to the vehicle (e.g., not part of the vehicle). As a non-limiting example, driveline 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of driveline 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read exclusive memory) 165, random access memory 166, digital inputs/outputs 168, and a microcontroller 167. Controller 112 may receive input data and provide data to human/machine interface 140 via CAN 199.

Referring now to FIG. 2, inverter 134 is shown electrically coupled to electric energy storage device 132 (e.g., traction battery), the inverter 134 is directly electrically coupled to an electric machine 126 and external DC charger 260 is shown directly coupled to electric machine 126 and third transistor 224. With regard to FIG. 2, "directly electrically coupled" refers to a first electric component that is electrically coupled to a second electric component with no intervening electric components, excepting electric conductors. Electric conductors are shown in FIG. 2 as solid lines. Nodes 250 show connections between the various conductors, but not each node is labeled.

In this example, electric energy storage device 132 includes a plurality of battery cells that are connected in series to increase a voltage of electric energy storage device 132. Electric energy storage device 132 is shown with a first group of battery cells 234 and a second group of battery cells 233. The first group of battery cells is configured to have a first output voltage (e.g., 400 volts) when fully charged and the second group of battery cells is configured to have the same output voltage as the first group of battery cells. Thus, when the first and second groups are combined in series as shown in FIG. 2, the total voltage of the battery pack is the voltage of the first battery group plus the voltage of the second battery group. The electric energy storage device 132 includes a higher voltage battery terminal 132a, a lower voltage battery terminal 132b, and a middle voltage terminal 132c. The higher voltage battery terminal 132a is directly electrically coupled to the first group of battery cells 234. The middle voltage terminal 132c is directly electrically coupled to the first group of battery cells 234 and the second group of battery cells 233. The lower voltage battery terminal 132b is directly electrically coupled to the second group of battery cells 233. The voltage of the lower voltage battery terminal is less than a voltage of the middle voltage terminal, and voltage of the middle voltage battery terminal is less than a voltage of the higher voltage terminal.

Inverter 134 includes a controller 202 that may communicate with controller 112 shown in FIG. 1 via controller area network (not shown). Controller 202 is directly electrically coupled to bases of transistors 210-215 of inverter 134. Controller 202 may also be directly electrically coupled to the bases of transistors 220-224. Transistors 210-215 and transistors 220-224 are operated in switching mode and these transistors may be referred to as switches. Controller 202 may supply control signals to independently activate and deactivate transistors 210-215 and transistors 220-224. Controller 202 includes inputs and outputs 202a (e.g., digital inputs, digital outputs, analog inputs, analog outputs), memory 202b (e.g., non-transitory memory, random-access memory, and read exclusively), and processor 202c.

Transistors 210-215 and transistors 220-224 are shown as insulated gate bipolar transistors (IGBT), but in alternative configurations, these transistors may be metal oxide field effect transistors (MOSFETs), field effect transistors (FETs), or other known types of transistors. Controller 202 may activate IGBTs via supplying a higher potential voltage to gates of transistors 210-215 and transistors 220-224. Controller 202 may deactivate IGBTs via supplying a lower potential voltage to gates of transistors 210-215 and transistors 220-224. Gates of the transistors are indicted by the letters "B." Collectors of the transistors are indicated by letters "C." Emitters of the transistors are indicated by letters "E." Each transistor includes a diode and the diodes are biased to permit current flow from the transistor's emitter lead to the transistor's collector lead. The diode's anodes are labeled A and the diode's cathodes are labeled Ct. Inverter 134 also includes a filter capacitor 231.

Inverter 134 is also shown being directly electrically coupled to coils 126a, 126b, and 126c of electric machine 126 (e.g., a three phase electric machine that may be operated as a motor or generator). Electric machine 126 is constructed with coils 126a-126c in a wye configuration where the coils are tied together at node 250. A first conductor 251 electrically connects node 250, emitter of first transistor 220, and DC charger 260. A second conductor 253 electrically couples middle voltage terminal 132c to the emitter of second transistor 222 and the collector of third transistor 224. A third conductor 252 is electrically coupled to lower voltage battery terminal 132b of electric energy storage device 132 and anode of diode 230. First transistor 220 is shown in parallel with diode 220a. Second transistor 222 is shown in parallel with diode 222a. Third transistor 224 is shown in parallel with diode 224a. Fourth conductor 254 is shown electrically coupling the emitter of third transistor 224 to the cathode of diode 230 and DC charger 260. First transistor 220 is electrically connected in series to second transistor 222 via conductor 221. Third transistor 224 may selectively couple second conductor 253 to DC charger 260.

Thus, the system of FIGS. 1 and 2 provides for a vehicle power system, comprising: a traction battery comprising a first group of cells arranged in series and a second group of cells arranged in series, the first group of cells arranged in series with the second group of cells, a high voltage terminal directly electrically coupled to the first group of cells, a low voltage terminal directly electrically coupled to the second group of cells, a middle voltage terminal directly electrically coupled to the first group of cells and the second group of cells; an electric machine to provide propulsive effort for a vehicle; and an inverter coupled to the traction battery and the electric machine. In a first example, the vehicle power system further comprises a first conductor coupled to a node where three coils of the electric machine are directly electrically coupled, a second conductor directly electrically coupled to the middle voltage terminal, and a third conductor directly electrically coupled to the low voltage terminal. In a second example that may include the first example, the vehicle power system further comprises a first transistor directly electrically coupled to a second transistor in series, the first transistor directly coupled to the first conductor, the second transistor directly coupled to the second conductor. In a third example that may include one or both of the first and second examples, the vehicle power system further comprises a third transistor arranged along the second conductor and directly electrically coupled to the second transistor. In a fourth example that may include one or more of the first through third examples, the vehicle power system further comprises a first diode arranged in parallel with the first transistor, a second diode arranged in parallel with the second transistor, and a third diode arranged in parallel with the third transistor. In a fifth example that may include one or more of the first through fourth examples, the vehicle power system further comprises a fourth diode arranged along the third conductor. In a sixth example that may include one or more of the first through fifth examples, the vehicle power system further comprises six transistors forming an inverter, the six transistors electrically coupled to the high voltage terminal and the low voltage terminal.

The system of FIGS. 1 and 2 also provides for a vehicle power system, comprising: a first group of battery cells; a second group of battery cells arranged in series with the first group of battery cells; an inverter electrically coupled to the first group of battery cells and the second group of battery cells; and a controller including executable instructions stored in non-transitory memory that cause the controller to operate the vehicle power system in a first mode, a second mode, a third mode, and a fourth mode, the first mode a vehicle driving mode, the second mode a four hundred volt charging mode, the third mode an eight hundred volt charging mode, and the fourth mode a battery heating mode. In a first example, the vehicle power system includes where the four hundred volt charging mode includes charging the first group of battery cells at a different time than charging the second group of battery cells. In a second example that may include the first example, the vehicle power system includes where the eight hundred volt charging mode includes charging the first group of battery cells and the second group of battery cells simultaneously. In a third example that may include one or both of the first and second examples, the vehicle power system includes where the battery heating mode includes charging and discharging the first group of battery cells out of phase with charging and discharging the second group of battery cells. In a fourth example that may include one or more of the first through third examples, the vehicle power system includes where the heating mode includes activating and deactivating a plurality of switches of the inverter.

Figures 3, 4:
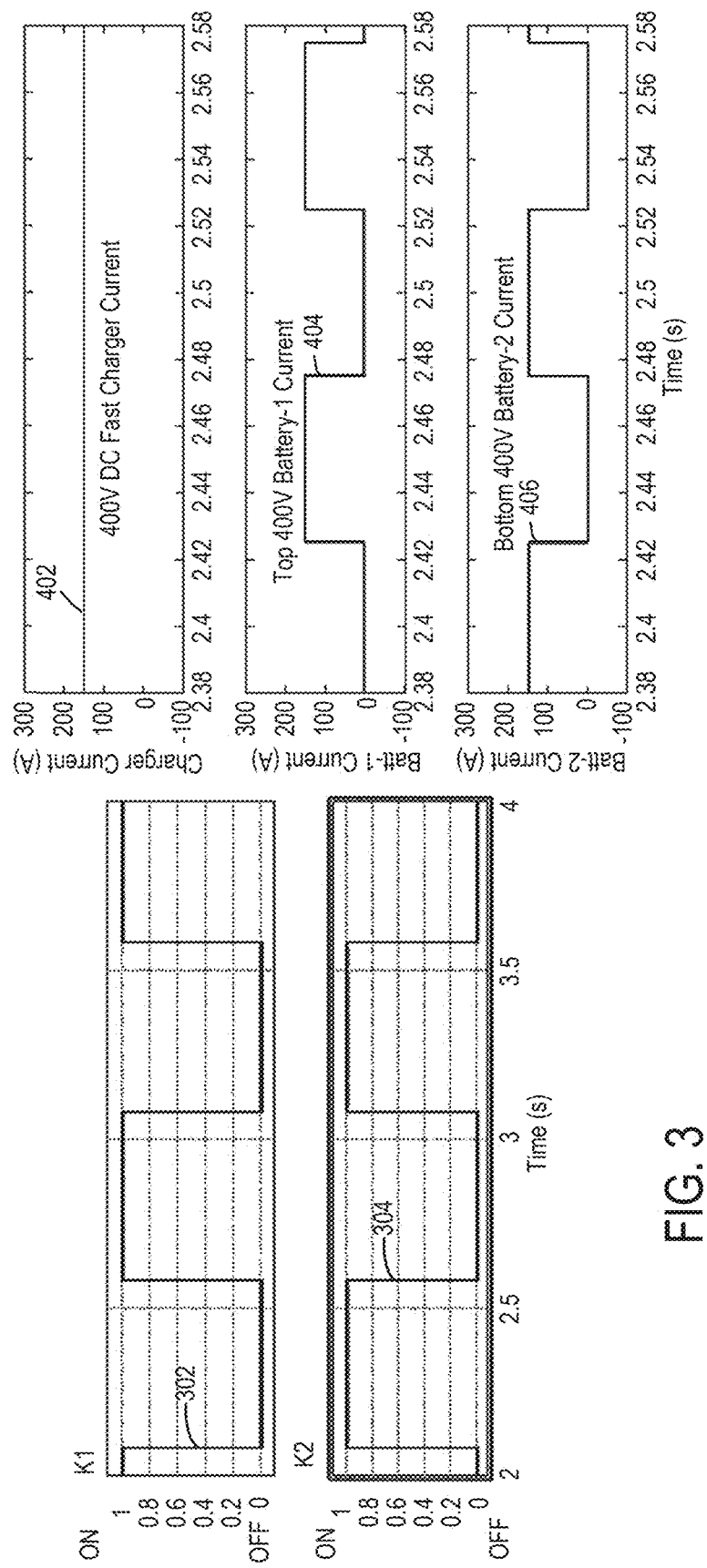
FIGS. 3 and 4 show charging system operating sequences.
Figure 5:
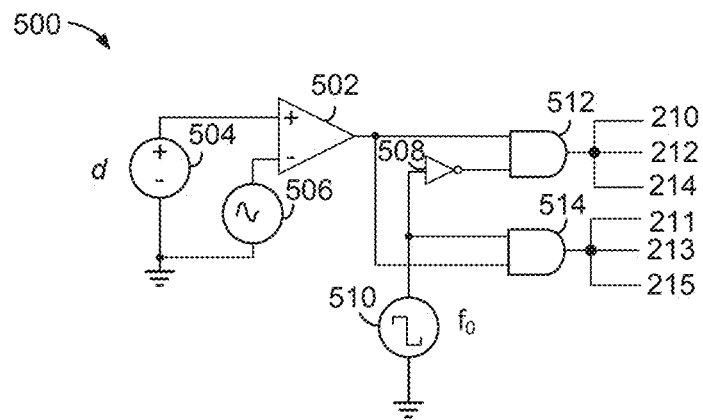
FIG. 5 shows an example charging system circuit.

Referring now to FIG. 3, prophetic plots illustrate how second transistor 222 and third transistor 224 are operated when an eight-hundred-volt battery is charged via a four-hundred-volt charger (e.g., a four-hundred-volt charging mode). The plots are time aligned.

The first plot from the top of FIG. 3 is a plot of a signal driving the second transistor 222 versus time. The vertical axis represents volts and the horizontal line represents time. The second transistor 222 is turned on such that it allows electric current to flow through the second transistor 222 when trace 302 is at a higher level (e.g., 1). The second transistor 222 is off such that electric current does not flow through the second transistor 222.

The second plot from the top of FIG. 3 is a plot of a signal driving the third transistor 224 versus time. The vertical axis represents volts and the horizontal line represents time. The third transistor 224 is turned on such that it allows electric current to flow through the third transistor 224 when trace 304 is at a higher level (e.g., 1). The third transistor 224 is off such that electric current does not flow through the third transistor 224.

Electric current may flow from the DC charger to the second group of battery cells 233, without flowing electric current to the first group of battery cells 234, when the second transistor is activated while the third transistor is deactivated. In particular, electric current from the DC changer may flow through diode 220a, second transistor 222, and through the middle voltage terminal 132c to charge the second group of battery cells. 233. Since the third transistor 224 is off when second transistor 222 is on, the DC charger is not short circuited.

Electric current may flow from the DC charger to the first group of battery cells 234, without flowing electric current to the second group of battery cells 233, when the third transistor is activated while the second transistor is deactivated. In particular, electric current from the DC changer may flow through coils 126a-126c and through diodes that are in parallel with transistors 210, 212, and 214, through the higher voltage battery terminal 132a to charge the first group of battery cells. 234. Since the second transistor 222 is off when third transistor 224 is on, the DC charger is not short circuited.

Referring now to FIG. 4, prophetic plots illustrate how electric current from the DC charger is distributed to the first group of battery cells and the second group of battery cells of the traction battery when an eight-hundred-volt battery is charged via a four-hundred-volt charger (e.g., a four-hundred-volt charging mode). The plots are time aligned.

The first plot from the top of FIG. 4 is a plot of 400-volt DC fast charger current output versus time. The vertical axis represents electric current in amperes and the horizontal line represents time. Trace 402 represents DC fast charger electric current output.

The second plot from the top of FIG. 4 is a plot the amount of electric current that is supplied to the first group of battery cells 234 during four-hundred-volt fast charging mode. The vertical axis represents the amount of electric current that is supplied to the first group 234 of battery cells of the electric energy storage device 132 and the horizontal line represents time. Trace 404 represents the amount of electric current that is delivered to the first group of battery cells.

The third plot from the top of FIG. 4 is a plot the amount of electric current that is supplied to the second group of battery cells 233 during four-hundred-volt fast charging mode. The vertical axis represents the amount of electric current that is supplied to the second group 233 of battery cells of the electric energy storage device 132 and the horizontal line represents time. Trace 406 represents the amount of electric current that is delivered to the second group of battery cells.

It may be observed that the DC fast charger current is a constant while the amount of current that is supplied to the first group of battery cells and the amount of current that is supplied to the second group of battery cells changes. The electric current that is delivered to the first group of battery cells is one hundred and eighty degrees out of phase with the amount of electric current that is delivered to the second group of battery cells. This is because of the way that the second and third transistors are operated. Further, this allows the first group of battery cells to charge when the second group of battery cells is not charging and vice-versa. Further, the amount of time that the first group of battery cells is charging is equal to the amount of time that the second group of battery cells is charging so that the two groups of battery cells charge evenly.

Referring now to FIG. 5, an example circuit 500 for heating an eight-hundred-volt battery, or an alternative voltage battery that includes a middle voltage terminal, is shown. The circuit 500 may be operated when the vehicle is stationary and not moving. Further, the example circuit 500 may be activated when the vehicle that includes the circuit is not electrically coupled to an external charger. The circuit 500 may be activated when the first switch or transistor 220 and the second transistor or switch 22 are turned on and when the third transistor or switch 224 is turned off.

Circuit 500 includes a duty cycle voltage source 504, a comparator 502, a carrier wave voltage source 506, a square wave voltage source 510, two AND gates 512/514, and a NOT gate 508. The two AND gate outputs drive, or are the inputs to the bases of transistors 210-215. The duty cycle voltage source output is input to the + terminal of comparator 502 and the carrier wave power supply output is input to the − terminal of comparator 502. The output of comparator 502 and the output of NOT gate 508 are input to separate inputs of AND gate 512. The bases of transistors 210, 212, and 214 are driven by the output of AND gate 512. Square wave voltage source output is delivered to NOT gate 508 and to AND gate 514. The output of comparator 502 is also delivered to the input of AND gate 514. The AND gate 514 drives the bases of transistors 211, 213, and 215.

Figure 6:
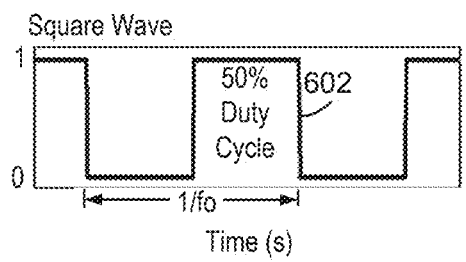
FIGS. 6-8 show additional charging system operating sequences.

Referring now to FIG. 6, an output voltage of square wave voltage source 510 is shown. Trace 602 represents a voltage that is output of square wave voltage source 510 of FIG. 5. The square wave varies between zero volts and 1 volt in this example. The square wave may cause NOT gate 508, AND gate 512, and AND gate 514 to change operating state. In this example, the duty cycle of the square wave is 50% and the frequency of the square wave is $f_o$.

Figure 7:
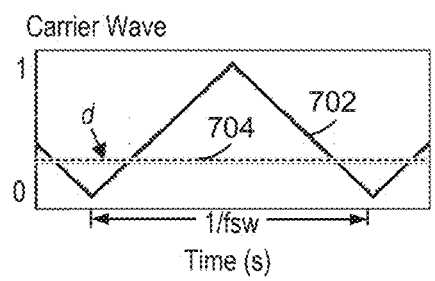

Referring now to FIG. 7, an output voltage of duty cycle voltage source 504 and output of carrier wave voltage source 506 is shown. Trace 702 represents a voltage that is output of carrier wave voltage source 506 of FIG. 5. Trace 704 represents a voltage that is output of duty cycle voltage source 504 of FIG. 5. The carrier wave varies between zero volts and 1 volt in this example. The comparator output may change state whenever the carrier voltage goes above or below the duty cycle voltage. In this example, the frequency of the carrier wave is $f_{sw}$.

Figure 8:
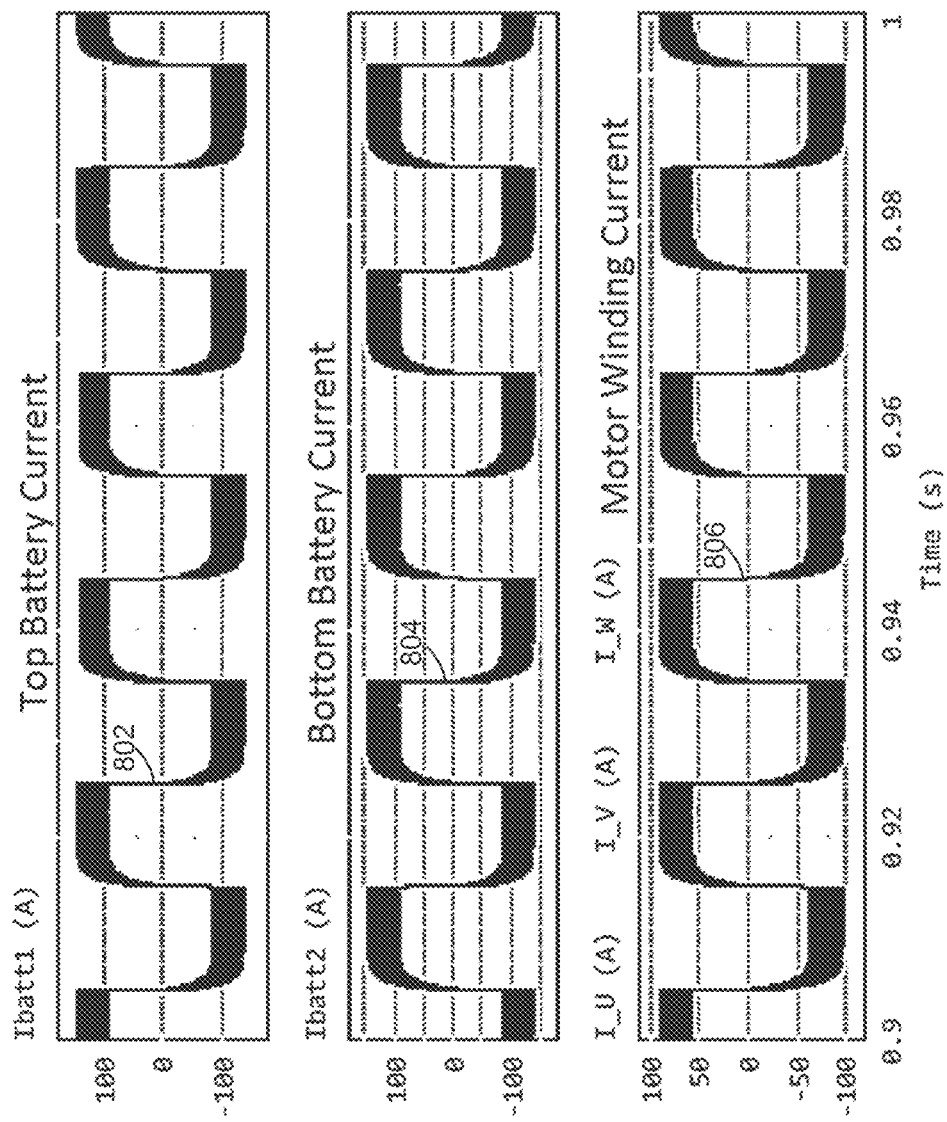

Referring now to FIG. 8, prophetic electric current flow during heating of a battery that includes a middle voltage terminal is shown. The plots of FIG. 8 are time aligned.

The first plot from the top of FIG. 8 is a plot of current flow into (−) and out of (+) the first group (e.g., 234 of FIG. 2) of battery cells of the traction battery. The vertical axis represents electric current flow into and out of the first group of battery cells and the horizontal axis represents time. Trace 802 represents the amount of electric current flowing into and out of the first group of battery cells.

The second plot from the top of FIG. 8 is a plot of current flow into (−) and out of (+) the second group (e.g., 233 of FIG. 2) of battery cells of the traction battery. The vertical axis represents electric current flow into and out of the second group of battery cells and the horizontal axis represents time. Trace 804 represents the amount of electric current flowing into and out of the second group of battery cells.

The third plot from the top of FIG. 8 is a plot of current flow into (−) and out of (+) the electric machine windings (e.g., windings of 126 of FIG. 2) of battery cells of the traction battery. The vertical axis represents electric current flow into and out of the windings of the electric machine and the horizontal axis represents time. Trace 806 represents the amount of electric current flowing into and out of the electric machine windings.

During the battery heating mode, the first group of battery cells are supplied with current and supply current inversely to the second group of battery cells. Driving current into and out of the battery cells to the electric machine windings causes the traction battery to generate heat and the heat warms the traction battery. The traction motor does not generate torque in this mode.

Figure 9:
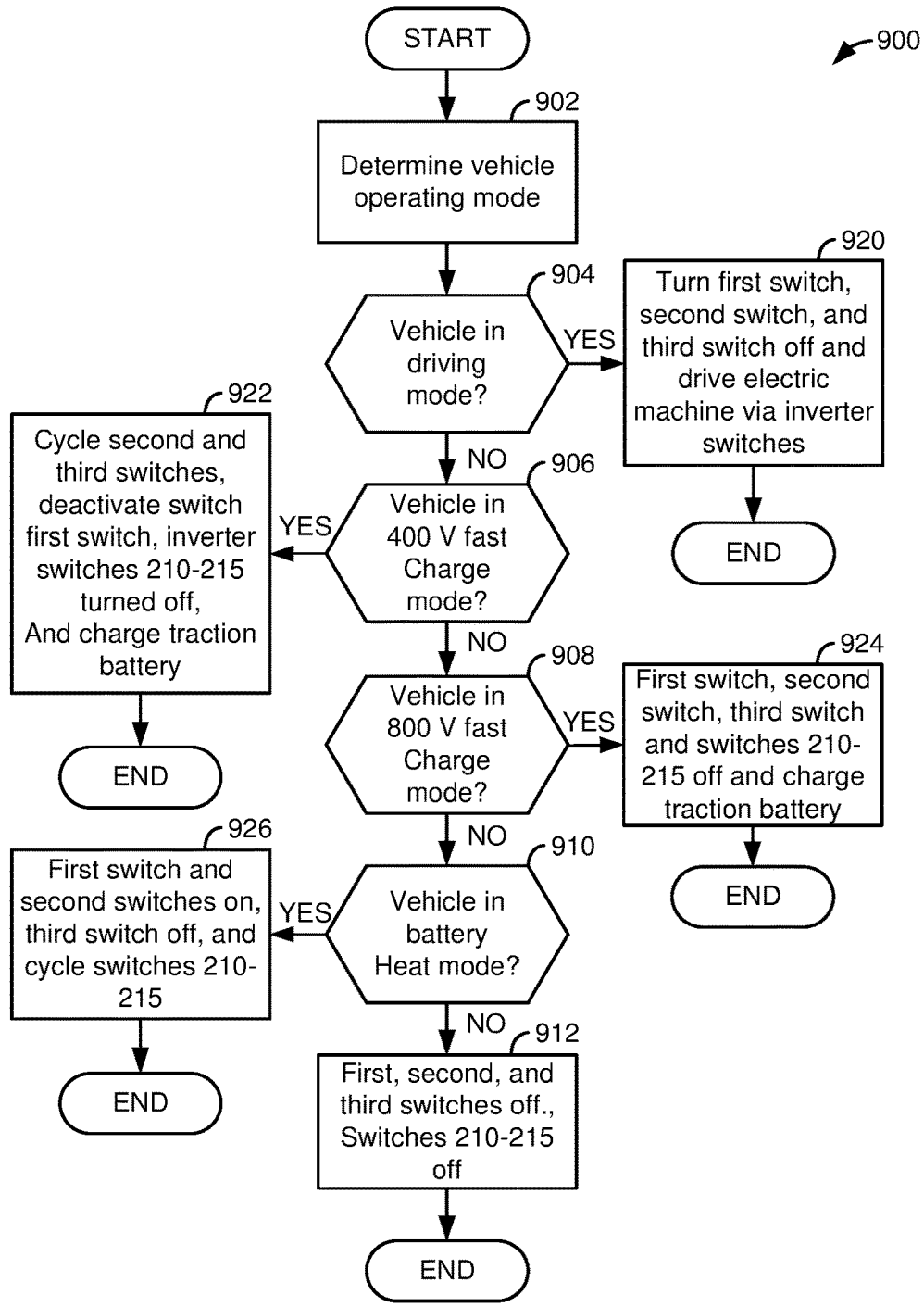
FIG. 9 shows a flow chart of a method for operating a vehicle charging and heating system.

Referring now to FIG. 9, a method for charging and heating a traction battery is shown. The method of FIG. 9 may be included as executable instructions stored in non-transitory memory of the system of FIGS. 1 and 2. In addition, the methods of FIG. 9 may work in cooperation with the system of FIGS. 1 and 2 to selectively charge a traction battery using chargers that output different voltage levels. Further, the method of FIG. 9 may provide a highly efficient way to heat a traction battery when a vehicle that includes the traction battery is not moving.

At 902, method 900 determines a vehicle operating mode. The vehicle operating modes may include but are not limited to a driving mode where the traction battery may be providing power to propel the vehicle while the traction battery is not being charged. The vehicle operating modes may also include a four-hundred-volt charging mode for an eight-hundred-volt traction battery, which may also be referred to as a switched charging mode. The vehicle operating modes may also include an eight-hundred-volt charging mode, or switchless charging mode. Further, the vehicle modes may include a traction battery heating mode. Method 900 may determine the vehicle's operating mode according to inputs to the vehicle. For example, method 900 may judge that the vehicle is in driving mode if the vehicle's propulsion source is commanded based on driver demand pedal position and vehicle slowing pedal position. Method 900 may judge the vehicle is in switched charging mode if the vehicle is stopped and plugged into a DC charger that outputs 400 volts. Method 900 may judge that the vehicle is in switchless charging mode when the vehicle is stopped and plugged into an eight-hundred-volt charger. Method 900 may judge that the vehicle is in traction battery heating mode when the vehicle is stopped, ambient temperature is less than a threshold temperature and traction battery temperature is less than a threshold temperature. Method 900 proceeds to 904 after the vehicle operating mode is determined.

At 904, method 900 judges whether or not the vehicle is in driving mode. If so, the answer is yes and method 900 proceeds to 920. Otherwise, the answer is no and method 900 proceeds to 906.

At 920, method 900 turns first switch 220 off, second switch 222 off, and third switch 224 off. Method 900 also operates switches or transistors 210-215 so that electric machine 126 propels vehicle 121. Alternatively, method 900 may operate transistors 210-215 to convert the vehicle's kinetic energy into electrical energy that is stored in electric energy storage device 132. Method 900 may operate electric machine 126 via switching transistors 210-215 according to space vector pulse width modulation. Method 900 proceeds to exit.

At 906, method 900 judges whether or not the vehicle is in four-hundred-volt charging or switched charging mode. If so, the answer is yes and method 900 proceeds to 922. Otherwise, the answer is no and method 900 proceeds to 908.

At 922, method 900 begins switching a second transistor 222 and a third transistor 224 as shown in FIG. 3. In addition, first transistor 220 is commanded off (open) and transistors 210-215 are commanded off. The second transistor is switched inversely to the switching of the third transistor as shown in FIG. 3. This allows a first group of battery cells (e.g., 234) with a voltage of four-hundred volts or less to be charged via the four-hundred-volt charger. Further, it allows the second group of battery cells (e.g., 233) with a voltage of four-hundred-volts or less to be charged via the same four-hundred-volt charger. This switching and the circuit arrangement shown in FIG. 2 allows both the first group of battery cells and the second group of battery cells to be charged during one charging cycle (e.g., the period between when the first transistor is switched off a first time and switched off a second time as shown in FIG. 3). The first group of battery cells may be charged during a first portion of the period when the second group of battery cells is not charging and the second group of battery cells may be charge during a second portion of the period when the first group of battery cells are not charging. Thus, method 900 charges half of the battery's cells during a first portion of a charging period and charges the other half of battery cells during a second portion of the charging period.

During a first portion of a charging cycle when first transistor 220 is off and third transistor 224 is on, electric current flows from DC charger through coils 126a-126c; through diodes parallel with transistors 210, 212, and 214; to battery cells 234; with current returning via second conductor 253 and third transistor 224. During a second portion of the charging cycle when first transistor 220 is on and third transistor 224 is off, electric current flows from DC charger through diode 220a; through second transistor 222, through second conductor 253, to battery cells 233; with current returning via third conductor 252 and diode 230. Method 900 charges the battery and exits.

At 908, method 900 judges whether or not the vehicle is in eight-hundred-volt charging or un-switched charging mode. If so, the answer is yes and method 900 proceeds to 924. Otherwise, the answer is no and method 900 proceeds to 910.

At 924, method 900 switches first transistor 220, second transistor 222 off, third transistor 224 off, and transistors 210-215 off. The external DC charger is electrically coupled to electric machine 126 and voltage from the DC charger passes to node 250 before it moves on through the diodes that are in parallel with transistors 210, 212, and 214 before reaching higher voltage battery terminal 132a. The lower voltage battery terminal 132b is electrically coupled to the lower voltage side of the DC charger 260 via third conductor 252 and diode 230 of FIG. 2. Accordingly, the eight-hundred-volts that are output via the DC charger is applied across the two the first group of battery cells 234 and second group of battery cells 233 that are between higher voltage battery terminal 132a and the lower voltage battery terminal 132b. Thus, method 900 charges all of the battery's cells simultaneously. Method 900 charges the battery and exits.

At 910, method 900 judges whether or not the vehicle is in battery heating mode. If so, the answer is yes and method 900 proceeds to 926. Otherwise, the answer is no and method 900 proceeds to 912. The battery heating mode may be entered when the vehicle is not being driven the battery is not in four-hundred or eight-hundred volt charging modes, and when traction battery temperature is less than a threshold temperature.

At 926, method turns first switch 220 on and second switch 222 on. Method 900 also turns third switch 224 off. Method 900 drives transistors 210-215 via the circuit shown in FIG. 5. The transistors 210-215 are driven via a square wave and a carrier wave. In one example, the square wave has a frequency of 50 Hertz (Hz) and the carrier wave frequency is 10,000 Hz. Method 900 proceeds to exit after charging the traction battery.

At 912, method 900 turns the first, second, and third switches off and turns transistors 210-215 off. The vehicle and electric machine 126 may be deactivated at this time. Method 900 proceeds to exit.

Thus, the method of FIG. 9 provides for a method for a vehicle power system, comprising: in a first mode, alternating between delivering power from a first charger to a first group of battery cells of a traction battery and from the first charger to a second group of battery cells of the traction battery; in a second mode, delivering power from a second charger to the first group of battery cells and the second group of battery cells simultaneously. In a first example, the method further comprises in a third mode alternating between supplying current and receiving current via the first group of battery cells, and alternating between supplying and receiving current via the second group of battery cells, the first group of battery cells supplying electric current while the second group of battery cells is receiving electric current, and the first group of battery cells receiving electric current while the second group of battery cells supplies electric current. In a second example that may include the first example, the method includes where the first charger outputs a first voltage to the first group of battery cells and the second group of battery cells, and the second charger outputs a second voltage, the second voltage greater than the first voltage. In a third example that may include one or both of the first and second examples, the method further comprises and inverter including a plurality of switches and driving the plurality of switches during the third mode via a circuit comprising a comparator, two and gates, and a not gate. In a fourth example, the method includes where the first mode includes switching a second transistor in the vehicle power system inversely from switching of a third transistor in the vehicle power system. In a fifth mode that may include one or more of the first through forth modes, the method includes where the first mode includes applying a higher voltage to a second conductor during a first portion of a traction battery charging cycle, the second conductor directly electrically coupled to a middle voltage terminal of the second group of battery cells, and applying a lower voltage to the second conductor during a second portion of the traction battery charging cycle. In a sixth mode that may include one or more of the first through fifth modes, the method includes where the traction battery charging cycle includes charging the first group of battery cells during a first fifty percent of the traction battery charging cycle and charging the second group of battery cells during a second fifty percent of the traction battery charging cycle. In a seventh mode that may include one or more of the first through sixth modes, the method includes where the first group of battery cells are arranged in series with the second group of battery cells.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, the present description may be applied to electric vehicles and hybrid vehicles to advantage.

The invention claimed is:

1. A method for a vehicle power system, comprising:
 in a first mode, alternating between delivering power from a first charger to a first group of battery cells of a traction battery and from the first charger to a second group of battery cells of the traction battery; and
 in a second mode, delivering power from a second charger to the first group of battery cells and the second group of battery cells simultaneously, where the first mode includes switching a second transistor in the vehicle power system inversely from switching of a third transistor in the vehicle power system.

2. The method of claim 1, where the first group of battery cells are arranged in series with the second group of battery cells.

3. A method for a vehicle power system, comprising:
 in a first mode, alternating between delivering power from a first charger to a first group of battery cells of a traction battery and from the first charger to a second group of battery cells of the traction battery;

in a second mode, delivering power from a second charger to the first group of battery cells and the second group of battery cells simultaneously; and in a third mode alternating between supplying current and receiving current via the first group of battery cells, and alternating between supplying and receiving current via the second group of battery cells, the first group of battery cells supplying electric current while the second group of battery cells is receiving electric current, and the first group of battery cells receiving electric current while the second group of battery cells supplies electric current.

4. The method of claim 3, where the first charger outputs a first voltage to the first group of battery cells and the second group of battery cells, and the second charger outputs a second voltage, the second voltage greater than the first voltage.

5. The method of claim 4, further comprising and inverter including a plurality of switches and driving the plurality of switches during the third mode via a circuit comprising a comparator, two and gates, and a not gate.

6. A method for a vehicle power system, comprising:
in a first mode, alternating between delivering power from a first charger to a first group of battery cells of a traction battery and from the first charger to a second group of battery cells of the traction battery;
in a second mode, delivering power from a second charger to the first group of battery cells and the second group of battery cells simultaneously, where the first mode includes applying a higher voltage to a second conductor during a first portion of a traction battery charging cycle, the second conductor directly electrically coupled to a middle voltage terminal of the second group of battery cells, and applying a lower voltage to the second conductor during a second portion of the traction battery charging cycle.

7. The method of claim 6, where the traction battery charging cycle includes charging the first group of battery cells during a first fifty percent of the traction battery charging cycle and charging the second group of battery cells during a second fifty percent of the traction battery charging cycle.

8. A vehicle power system, comprising:
a first group of battery cells;
a second group of battery cells arranged in series with the first group of battery cells;
an inverter electrically coupled to the first group of battery cells and the second group of battery cells; and
a controller including executable instructions stored in non-transitory memory that cause the controller to operate the vehicle power system in a first mode, a second mode, a third mode, and a fourth mode, the first mode a vehicle driving mode, the second mode a four hundred volt charging mode, the third mode an eight hundred volt charging mode, and the fourth mode a battery heating mode, where the battery heating mode includes charging and discharging the first group of battery cells out of phase with charging and discharging the second group of battery cells.

9. The vehicle power system of claim 8, further comprising:
a traction battery comprising the first group of battery cells and the second group of battery cells;
a high voltage terminal directly electrically coupled to the first group of battery cells;
a low voltage terminal directly electrically coupled to the second group of battery cells;
a middle voltage terminal directly electrically coupled to the first group of battery cells and the second group of battery cells,
an electric machine, wherein the electric machine provides propulsive effort for a vehicle in the vehicle driving mode and
wherein the inverter coupled to the traction battery and the electric machine.

10. The vehicle power system of claim 9, further comprising a first conductor coupled to a node where three coils of the electric machine are directly electrically coupled, a second conductor directly electrically coupled to the middle voltage terminal, and a third conductor directly electrically coupled to the low voltage terminal.

11. The vehicle power system of claim 10, further comprising a first transistor directly electrically coupled to a second transistor in series, the first transistor directly coupled to the first conductor, the second transistor directly coupled to the second conductor.

12. The vehicle power system of claim 11, further comprising a third transistor arranged along the second conductor and directly electrically coupled to the second transistor.

13. The vehicle power system of claim 12, further comprising a first diode arranged in parallel with the first transistor, a second diode arranged in parallel with the second transistor, and a third diode arranged in parallel with the third transistor.

14. The vehicle power system of claim 13, further comprising a fourth diode arranged along the third conductor.

15. The vehicle power system of claim 14, further comprising six transistors included in the inverter, the six transistors electrically coupled to the high voltage terminal and the low voltage terminal.

16. The vehicle power system of claim 8, where the four hundred volt charging mode includes charging the first group of battery cells at a different time than charging the second group of battery cells.

17. The vehicle power system of claim 8, where the eight hundred volt charging mode includes charging the first group of battery cells and the second group of battery cells simultaneously.

18. The vehicle power system of claim 8, where the battery heating mode includes activating and deactivating a plurality of switches of the inverter.

* * * * *